United States Patent
Droin et al.

(10) Patent No.: US 6,871,539 B2
(45) Date of Patent: Mar. 29, 2005

(54) VOLUMETRIC FLUID METER

(75) Inventors: Frédéric Droin, Liergues (FR); Laurent Demia, Macon (FR)

(73) Assignee: ACTARIS SAS (FR)

( * ) Notice: Subject to any disclaimer, the term of this patent is extended or adjusted under 35 U.S.C. 154(b) by 0 days.

(21) Appl. No.: 10/616,512

(22) Filed: Jul. 8, 2003

(65) Prior Publication Data

US 2004/0055394 A1 Mar. 25, 2004

(30) Foreign Application Priority Data

Jul. 9, 2002 (FR) .......................................... 02 09001

(51) Int. Cl.$^7$ ................................................. G01F 3/08
(52) U.S. Cl. ......................................................... 73/257
(58) Field of Search ........................ 73/257, 253, 252, 73/239

(56) References Cited

U.S. PATENT DOCUMENTS

| | | | | |
|---|---|---|---|---|
| 582,302 A | * | 5/1897 | Nash | 73/257 |
| 1,856,850 A | * | 5/1932 | Marden | 73/257 |
| 1,973,670 A | * | 9/1934 | Kruth | 73/257 |
| 1,999,684 A | * | 4/1935 | Bradley | 73/257 |
| 5,576,489 A | | 11/1996 | Munck et al. | 73/257 |

FOREIGN PATENT DOCUMENTS

| | | |
|---|---|---|
| DE | 19938362 | 2/2001 |
| FR | 2706033 | 12/1994 |
| FR | 2719663 | 11/1995 |
| WO | 9322631 | 11/1993 |

OTHER PUBLICATIONS

Preliminary Search report dated Mar. 3, 2003.
Preliminary Search Report dated Jan. 20, 2003.

* cited by examiner

Primary Examiner—Harshad Patel
(74) Attorney, Agent, or Firm—Sofer & Haroun, LLP

(57) ABSTRACT

A volumetric fluid meter has a cylindrical measuring chamber with a lateral wall, a bottom (1) and a lid (3), a lower cylinder (4) and an upper cylinder (5), having the same diameter, which is less than the diameter of the chamber. An inlet orifice and an outlet orifice (8) respectively admit fluid to and evacuate fluid from the chamber. A cylindrical piston (11) is disposed eccentrically and guided kinematically in the chamber and effects an oscillatory movement in the chamber as a result of the displacement of a volume of fluid. A fixed partition (9) between the inlet orifice and the outlet orifice, lies radially between the lateral wall and the lower and upper cylinders, and lies axially between the bottom and the lid. The meter further includes a vertical groove (17) extending at least partly along the lower and upper cylinders and is in communication with one of the inlet and outlet orifices, and is situated in the vicinity of said fixed partition.

4 Claims, 4 Drawing Sheets

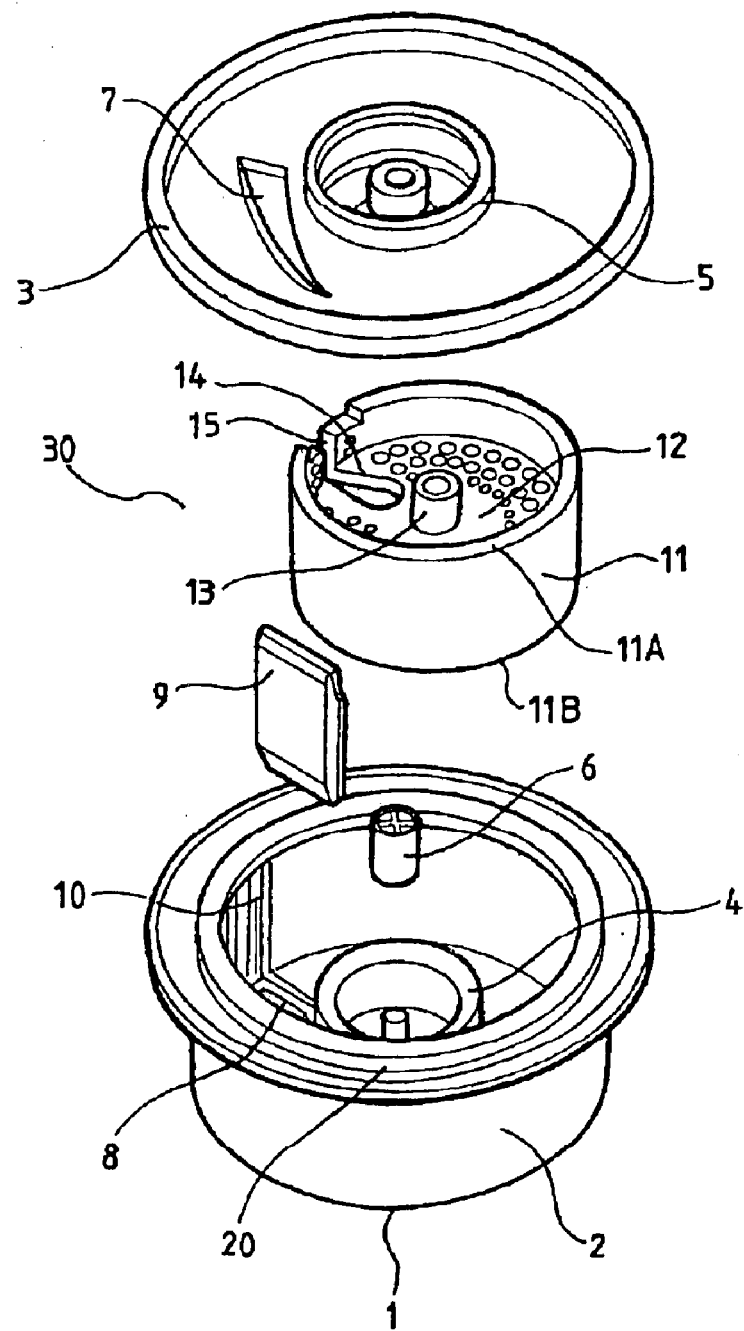
FIG_1
(PRIOR ART)

FIG_2
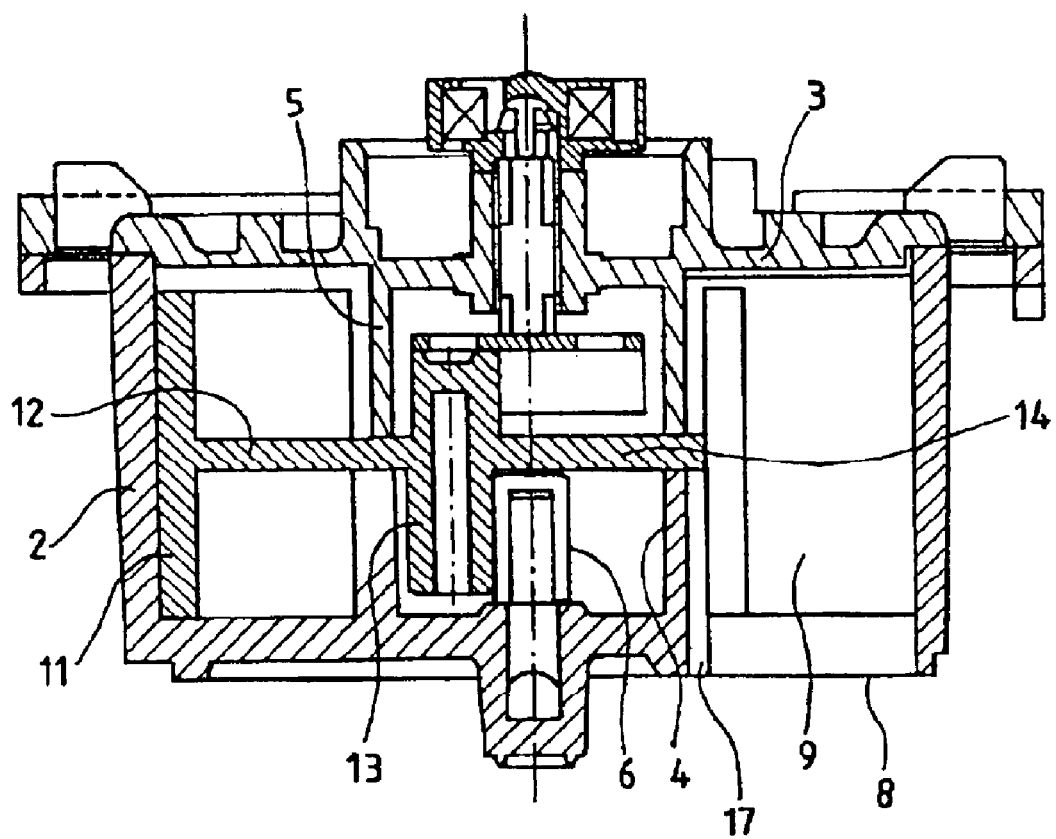

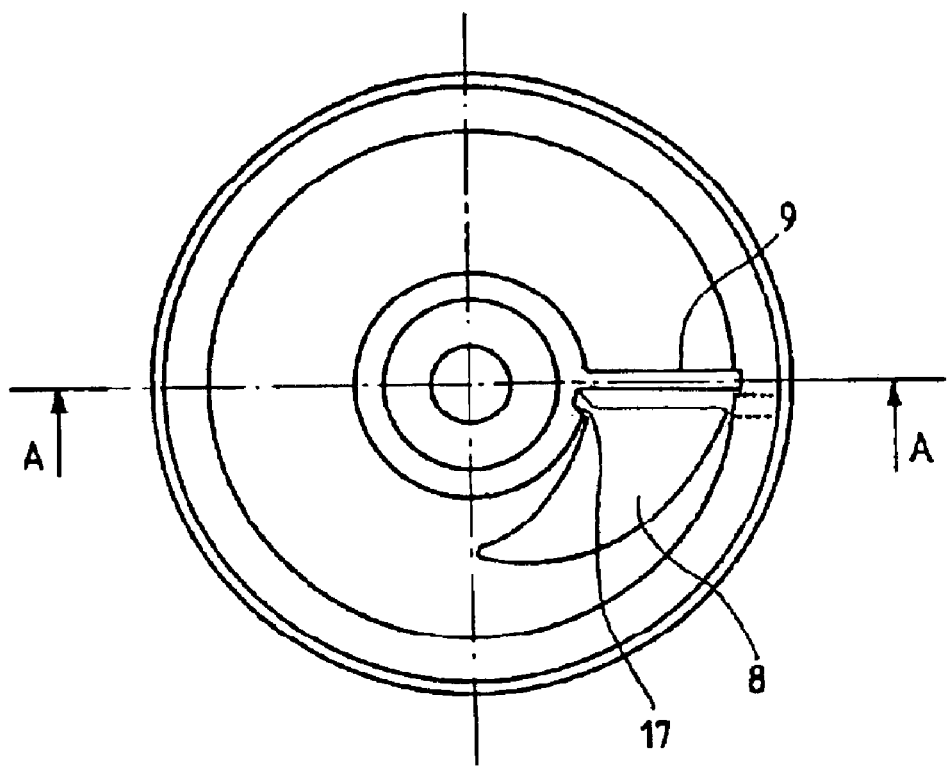
FIG_3

FIG_4
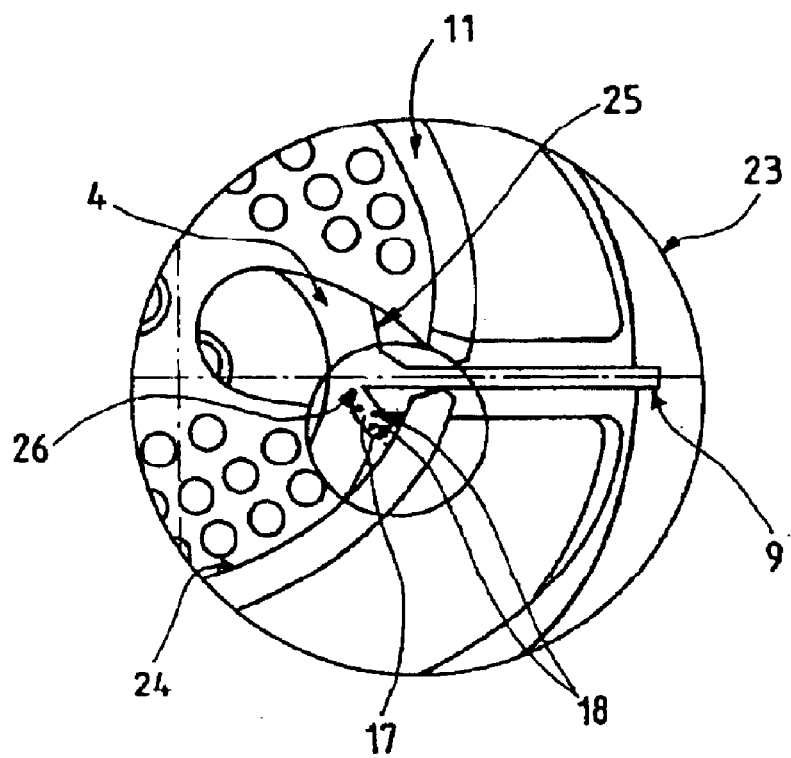

VOLUMETRIC FLUID METER

The invention relates to a volumetric fluid meter adapted to measure the flowrate of a fluid flowing in a pipe.

The invention relates more particularly to the technical field of oscillating piston volumetric fluid meters, the technology of which is well known to the person skilled in the art.

As shown in the FIG. 1 exploded perspective view, a prior art meter of the above kind includes a measuring box.

In this type of meter, the measuring box is the key component on which the accuracy of the flowrate measurement depends. The measuring box is a cylindrical chamber 30 which has a bottom 1, a lateral wall 2, and a lid 3. The bottom 1 and the lid 3 respectively comprise a lower cylinder 4 and an upper cylinder 5, of the same diameter, which is less than that of the chamber. The two cylinders 4, 5 are centered on the axis of the chamber. The lower cylinder has at its center a metal rod 28 over which is nested a roller 6. The bottom and the lid have an inlet aperture 7 and an output aperture 8 for entry of fluid into the chamber and evacuation of fluid from the chamber, respectively. The chamber 30 also includes a fixed rectangular partition 9 between the inlet orifice 7 and the output orifice 8. The partition extends radially between the lateral wall 2 and the lower and upper cylinders 4, 5 and axially between the bottom 1 and the lid 3. The bottom, the lateral wall, the lid and the lower and upper cylinders incorporate a groove 10 in which the partition is engaged. A cylindrical piston 11 whose diameter is less than that of the chamber but greater than the diameters of the lower and upper cylinders is positioned eccentrically within the chamber. The piston 11 has at mid-height a plane wall 12 perforated with holes and supporting at its center two nipples 13, one directed toward the bottom and the other toward the lid. The wall further includes a pear-shaped opening 14 oriented radially and positioned eccentrically. The pear-shaped opening opens onto a slot 15 running the full height of the piston.

The meter incorporating the above kind of measuring box operates in accordance with the principle of admitting into the chamber 30 via the inlet orifice 7 a given volume of fluid which, by communicating its energy to the piston, causes the latter to move in rotation, and evacuating the given volume of fluid via the outlet orifice 8. Accordingly, each revolution of the piston 11 corresponds to the passage of a given volume of fluid. The general movement of the piston is an oscillatory movement with the axis of the piston describing a circle around the axis of the chamber 30 and the slot 15 in the piston sliding along the partition 9. The piston is guided kinematically in the chamber 30 by virtue of the engagement of the partition 9 in the vertical slot 15 and in the pear-shaped opening 14 and the engagement of the nipple 13 between the roller 6 and the lower cylinder 4. Although it is positioned between the lower cylinder 4 and the upper cylinder 5, the plane wall of the piston remains free to move in a plane.

The invention therefore relates to an oscillating piston volumetric fluid meter comprising a cylindrical chamber including a lateral wall, a bottom and a lid, and a cylindrical piston disposed eccentrically and guided kinematically in the chamber, the piston effecting an oscillatory movement in the chamber caused by the displacement of a volume of fluid and having faces sliding on fixed parts of the chamber.

A particular problem associated with this type of meter is its poor behavior when metering water transporting solid particles such as grains of sand. This is because the clearances between the various components of the chamber are such that a mere grain of sand can completely block movement of the piston or at least cause a significant reduction in metrological performance over time. The effect of these solid particles is particularly harmful at the corners of the fixed partition between the inlet orifice and the outlet orifice. At present this weakness excludes this metering technology from many markets in geographical areas in which the water is "charged". Likewise, the water may contain solid particles when working on a network in connection with commissioning or maintenance operations.

Document WO93/22631 describes a solution to the problem, and to this end describes a volumetric meter comprising a groove on a wall of a measuring chamber in the vicinity of a fixed partition between an inlet orifice and an outlet orifice, the groove enabling evacuation of solid particles in the fluid via an enlargement of the surface of the outlet orifice to which the groove leads. This groove prevents accumulation of particles between the outside diameter of the piston and the inside diameter of the measuring chamber.

However, its implementation gives rise to certain difficulties in that the solid particles can also become immobilized between the interior diameter of the piston and the exterior diameter of the lower and upper cylinders of the chamber.

The present invention aims to provide an oscillating piston volumetric fluid meter which prevents the immobilization of solid particles between the interior diameter of the piston and the exterior diameter of the lower and upper cylinders of the chamber and also evacuates solid particles.

To this end, the present invention proposes an oscillating piston volumetric fluid meter comprising a cylindrical measuring chamber including:

- a lateral wall,
- a bottom and a lid,
- a lower cylinder and an upper cylinder having the same diameter, which is less than the diameter of said chamber,
- an inlet orifice and an outlet orifice for respectively admitting fluid to and evacuating fluid from said chamber,
- a cylindrical piston disposed eccentrically and guided kinematically in said chamber and effecting an oscillatory movement in said chamber as a result of the displacement of a volume of fluid, and
- a fixed partition between said inlet orifice and said outlet orifice, lying radially between said lateral wall and said lower and upper cylinders, and lying axially between said bottom and said lid,
- which volumetric meter is characterized in that it includes a vertical groove extending at least partly along said lower and upper cylinders and in communication with one of said inlet and outlet orifices, said groove being situated in the vicinity of said fixed partition.

Thanks to the invention, the meter prevents immobilization of solid particles between the interior diameter of the piston and the exterior diameter of the lower and upper cylinders of the chamber, the particles entering the vertical groove. The meter also evacuates particles via one of the orifices in communication with the groove.

Said groove advantageously opens onto an enlargement of one of said orifices.

Said groove is advantageously tangential to said fixed partition.

Said groove advantageously has a width less than or equal to 2 mm.

Other features and advantages of the present invention will become apparent in the course of the following description of one embodiment of the invention, which is given by way of illustrative and nonlimiting example.

In the drawings:

FIG. 1 is an exploded perspective view of a prior art oscillating piston volumetric meter, FIG. 2 is a view in vertical section taken along the line AA in FIG. 3 of a volumetric meter according to the invention, FIG. 3 is a plan view of a volumetric meter according to the invention without the piston and the lid, and FIG. 4 is a plan view to a larger scale of a portion surrounding the fixed wall of a volumetric meter according to the invention.

Items common to more than one figure are identified by the same reference number in all the figures in which they appear.

FIG. 1 has already been described in connection with the prior art.

FIG. 3 is a plan view of a volumetric meter according to the invention. FIG. 2 is a view of the same volumetric meter according to the invention in vertical section taken along the line AA in FIG. 3.

For reasons of clarity, the piston 11 and the lid 3 shown in FIG. 2 are intentionally omitted from FIG. 3.

The upper cylinder 5 incorporates a vertical groove 17 tangential to the fixed partition 9 and extended on the lower cylinder 4. The section of the outlet orifice 8 is enlarged so that the vertical groove 17 opens into the enlargement. The vertical groove 17 therefore extends the entire length of the measuring chamber.

FIG. 4 is a plan view to a larger scale of a portion 23 surrounding the fixed partition 9, showing how the vertical groove 17 of the meter according to the invention works.

A "charged" fluid contains solid particles 18 that take up a position between the interior diameter 24 of the piston and the exterior diameter 25 of the lower cylinder 4 and the upper cylinder (not shown) of the measuring chamber. The groove 17 is on both the lower cylinder 4 and the upper cylinder, and enables the particles 18 to flow.

The groove 17 opens onto an enlargement 26 of the outlet orifice 8 which evacuates particles 18 flowing along the groove 17. The section of the enlargement 26 is substantially identical to the section of the groove 17, and thus small compared to the section of the output orifice 8, in order not to interfere with metrology.

Of course, the invention is not limited to the embodiment just described.

In particular, in the embodiment described the groove is on the same side as the outlet orifice, but it could equally well be on the same side as the inlet orifice.

Furthermore, a groove could equally well be provided on each side of the fixed partition.

What is claimed is:

1. An oscillating piston volumetric fluid meter having a cylindrical measuring chamber comprising:

a lateral wall, a bottom and a lid, a lower cylinder and an upper cylinder having the same diameter, which is less than the diameter of said chamber, an inlet orifice and an outlet orifice for respectively admitting fluid to and evacuating fluid from said chamber, a cylindrical piston disposed eccentrically and guided kinematically in said chamber and effecting an oscillatory movement in said chamber as a result of the displacement of a volume of fluid, a fixed partition between said inlet orifice and said outlet orifice, lying radially between said lateral wall and said lower and upper cylinders, and lying axially between said bottom and said lid; and a vertical groove extending at least partly along said lower and upper cylinders and in communication with one of said inlet and outlet orifices, said groove being situated in the vicinity of said fixed partition.

2. A volumetric meter according to claim 1 characterized in that said vertical groove opens onto an enlargement of one of said orifices.

3. A volumetric meter according to claim 1 characterized in that said vertical groove is tangential to said fixed partition.

4. A volumetric meter according to claim 1 characterized in that said vertical groove has a width less than or equal to 2 mm.

* * * * *